US010579049B2

(12) United States Patent
Safai et al.

(10) Patent No.: US 10,579,049 B2
(45) Date of Patent: Mar. 3, 2020

(54) AUTOMATIC MATERIAL CUTTING SYSTEM

(71) Applicant: The Boeing Company, Huntington Beach, CA (US)

(72) Inventors: Morteza Safai, Newcastle, WA (US); Ronald Gail Turner, Arlington, WA (US)

(73) Assignee: The Boeing Company, Chicago, IL (US)

( * ) Notice: Subject to any disclaimer, the term of this patent is extended or adjusted under 35 U.S.C. 154(b) by 516 days.

(21) Appl. No.: 14/479,835

(22) Filed: Sep. 8, 2014

(65) Prior Publication Data
US 2016/0070256 A1 Mar. 10, 2016

(51) Int. Cl.
G05B 19/418 (2006.01)
G05B 19/401 (2006.01)

(52) U.S. Cl.
CPC ..... G05B 19/41815 (2013.01); G05B 19/401 (2013.01); G05B 2219/31428 (2013.01); G05B 2219/35077 (2013.01); G05B 2219/35162 (2013.01); G05B 2219/45196 (2013.01)

(58) Field of Classification Search
CPC ............ G05B 19/401; G05B 19/41815; G05B 2219/31428; G05B 2219/35077; G05B 2219/35162; G05B 2219/45196; Y02P 80/40
USPC .......................................................... 700/98
See application file for complete search history.

(56) References Cited

U.S. PATENT DOCUMENTS 3,546,990 A * 12/1970 Schneider .............. B26D 7/015
493/372
3,603,446 A * 9/1971 Maxey ................. B65G 47/244
198/401
4,047,457 A * 9/1977 Stubbings .............. B23D 33/04
83/76.8

(Continued)

FOREIGN PATENT DOCUMENTS

CN 1268911 A 10/2000
CN 1270099 A 10/2000

OTHER PUBLICATIONS

European Extended Search Report, Application No. 15183434.8, dated Jan. 26, 2016, pp. 10.

(Continued)

Primary Examiner — Ryan D. Coyer
(74) Attorney, Agent, or Firm — Armstrong Teasdale LLP

(57) ABSTRACT

An automatic component fabrication system, for use in fabricating a component, includes a control system having a memory that includes a computerized model of the component to be fabricated. A first monitoring system including a first illumination device and at least one camera is communicatively coupled to the control system and is configured to determine a position of the material at a first location. A cutting system is communicatively coupled to the control system and is configured to cut the component from a sheet of material based on the determined position and the computerized model. The automatic component fabrication system also includes a second monitoring system including a second illumination device and at least one camera. The second monitoring system is communicatively coupled to the control system and is configured to compare the fabricated component to the computerized model.

18 Claims, 3 Drawing Sheets

(56) References Cited

U.S. PATENT DOCUMENTS

| | | | | |
|---|---|---|---|---|
| 5,163,008 | A * | 11/1992 | Gerber | B26D 7/015 |
| | | | | 226/27 |
| 5,258,917 | A | 11/1993 | Bruder et al. | |
| 5,698,814 | A | 12/1997 | Parsons et al. | |
| 5,882,427 | A | 3/1999 | Michanickl et al. | |
| 6,058,681 | A * | 5/2000 | Recchia, Jr. | B65B 9/093 |
| | | | | 53/373.5 |
| 6,462,913 | B1 | 10/2002 | Chew | |
| 6,639,660 | B1 | 10/2003 | Beck et al. | |
| 6,776,409 | B2 * | 8/2004 | Cook | B65H 29/145 |
| | | | | 271/189 |
| 7,480,037 | B2 | 1/2009 | Palmateer et al. | |
| 7,495,758 | B2 | 2/2009 | Walton | |
| 2006/0233435 | A1 * | 10/2006 | Lawson | G05B 19/401 |
| | | | | 382/151 |
| 2007/0277919 | A1 | 12/2007 | Savol et al. | |
| 2007/0280501 | A1 | 12/2007 | Walton | |
| 2008/0055591 | A1 * | 3/2008 | Walton | G01N 21/8901 |
| | | | | 356/237.1 |
| 2013/0184133 | A1 * | 7/2013 | Sugimoto | B65H 43/04 |
| | | | | 493/29 |
| 2014/0059875 | A1 * | 3/2014 | Yuhara | H01M 10/0404 |
| | | | | 33/613 |
| 2014/0361480 | A1 * | 12/2014 | Fox | G01R 31/2867 |
| | | | | 269/287 |

OTHER PUBLICATIONS

China Office Action for related application 201510564451.2 dated Mar. 2, 2018; 16 pp.
EP Examination Report for related application 15183434.8 dated Aug. 10, 2018; 8 pp.

* cited by examiner

AUTOMATIC MATERIAL CUTTING SYSTEM

BACKGROUND

The field of the disclosure relates generally to methods and systems for fabricating components, and more specifically, to cutting component patterns from a composite material.

At least some known components are fabricated by stacking multiple layers of pre-cut material patterns on top of one another and then curing the material layers together using a resin and various heat treatments. A template of the component is projected onto a sheet of composite material from which the patterns are cut by a metal blade. However, the metal blades become dull relatively quickly and require frequent replacement, which is expensive and leads to a significant amount of machine down-time. Additionally, when the blades are dull, they may not complete the cut to entirely separate the component from the sheet of material. When an operator attempts to remove a component that is not entirely separated from the sheet, the operator may pull the sheet of material offline and compromise the component patterns being cut upstream from the removal site. In such a situation, the sheet of material is advanced to restart the patterns and the unfinished patterns are discarded. Furthermore, at least some known cutting systems are unable to cut the component patterns to the exact size required and, therefore, the size of the components cut from the sheet of material may be larger than a final desired component size. As such, an operator subsequently trims the oversize component manually to achieve the final desired component size. Accordingly, at least some known component pattern cutting systems generate an unacceptable amount of waste and are labor intensive, thus making them expensive to operate.

BRIEF DESCRIPTION

In one aspect, an automatic component fabrication system for use in fabricating a component is provided. The automatic component fabrication system includes a control system having a memory that includes a computerized model of the component to be fabricated. A first monitoring system including a first illumination device and at least one camera is communicatively coupled to the control system and is configured to determine a position of the material at a first location. A cutting system is communicatively coupled to the control system and is configured to cut the component from a sheet of material based on the determined position and the computerized model. The automatic component fabrication system also includes a second monitoring system including a second illumination device and at least one camera. The second monitoring system is communicatively coupled to the control system and is configured to compare the fabricated component to the computerized model.

In another aspect, a method for forming a component is provided. The method includes determining an initial position of a sheet of material using a first monitoring system. The first monitoring system includes a first illumination device and at least one camera. The method also includes cutting the component from the sheet of material based on the determined initial position and based on a predetermined computerized model. A second monitoring system, including a second illumination device and at least one camera, then compares the fabricated component to the predetermined computerized model.

The features, functions, and advantages that have been discussed can be achieved independently in various implementations or may be combined in yet other implementations, further details of which can be seen with reference to the following description and drawings.

DETAILED DESCRIPTION

As used herein, the terms "processor" and "computer" and related terms, e.g., "processing device", "computing device", "central processing unit (CPU)", and "control system" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the implementations described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and a digital versatile disc (DVD) may also be used. Also, in the implementations described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary implementation, additional output channels may include, but not be limited to, an operator interface monitor.

Further, as used herein, the terms "software" and "firmware" are interchangeable, and include any computer program stored in memory for execution by personal computers, workstations, clients and servers.

The terms "high-pressure fluid jet", "cutting jet", and "fluid jet" used throughout should be understood to incorporate all types of high-pressure fluid jets, including but not limited to, high-pressure waterjets and high-pressure abrasive waterjets. In such systems, high-pressure fluid, typically water, flows through an orifice in a cutting head to form a high-pressure jet, into which abrasive particles are combined as the jet flows through a mixing tube. The high-pressure abrasive waterjet is discharged from the mixing tube and directed toward a component to cut the component along a designated path.

Although discussed herein in terms of waterjets, and abrasive waterjets in particular, the described techniques can be applied to any type of fluid jet, generated by high pressure or low pressure, whether or not additives or abrasives are used. In addition, these techniques can be modified to control the x-axis, y-axis, z-offset, and tilt and swivel (or other comparable orientation) parameters as functions of process parameters other than speed, and the particulars described herein.

Figure 1:
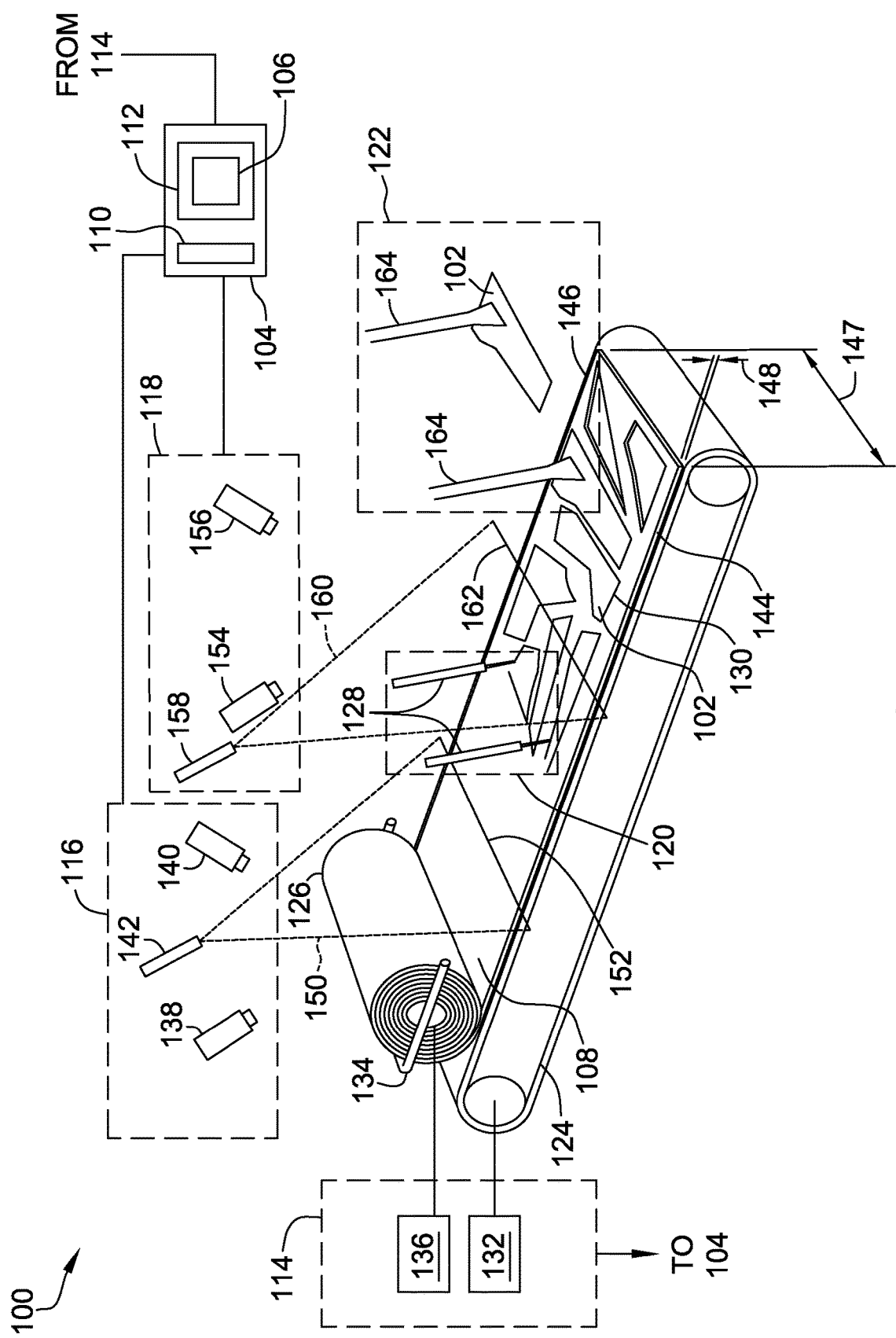
FIG. 1 is a schematic view of an exemplary automatic component fabrication system.

FIG. 1 is a schematic diagram illustrating an exemplary automatic component fabrication system 100 used to at least partially produce a component 102. Component fabrication system 100 includes a control system 104 configured to at least one of receive and/or generate a computerized model 106 of component 102 to be cut from a sheet of material 108. In the exemplary implementation, control system 104 includes a processor 110 and a memory device 112, operatively coupled to processor 110, having computer-executable instructions stored thereon for execution by processor 110. Control system 104 is configurable to perform one or more operations described herein by programming processor 110. For example, processor 110 is programmed by encoding an operation as one or more executable instructions and providing the executable instructions in memory device 112. Processor 110 may include one or more processing units, e.g., without limitation, in a multi-core configuration.

In the exemplary implementation, component fabrication system 100 also includes a conveyor system 114, a first monitoring system 116, a second monitoring system 118, a cutting system 120, and a component removal system 122, all of which are communicatively coupled to control system 104. Conveyor system 114 is configured to simultaneously operate a conveyor belt 124 and unfurl a material roll 126 into sheet 108 while maintaining a proper alignment of sheet 108 on conveyor belt 124. First monitoring system 116 inspects material sheet 108 proximate to material roll 126 to determine the position of sheet 108 on conveyor belt 126 and to detect the presence of foreign object debris (FOD) or folds or wrinkles in sheet 108. Cutting system 120 includes at least one cutting head 128 that follows a tool path determined by control system 104 to cut a pattern 130 in material sheet 108 to form component 102. Second monitoring system 118 inspects material sheet 108 downstream of cutting system 120 to determine the completion and accuracy of each pattern 130 to properly form component 102. Removal system 122 then removes each component 102 from material sheet 108 and places component 102 in a predetermined location corresponding to the component type.

Conveyor system 114 is communicatively coupled to control system 104 and provides support for material sheet 108. More specifically, conveyor system 114 includes a conveyor belt 124 that supports sheet 108 and is controlled by a first motor 132. Conveyor system 114 also includes an alignment device 134 that adjusts a position of material roll 126, which is controlled by a second motor 136, before conveyor belt 124 unfurls roll 126 into sheet 108. Alignment device 134 is also operable to adjust a position of material sheet 108 by moving roll 126 or by moving sheet 108 directly. Motors 132 and 136 are synched to one another such that when motor 132 is active to operate conveyor 124, motor 136 is also active to unfurl roll 126, and, similarly, when motor 132 is non-active, motor 136 is simultaneously non-active. Synching motors 130 and 136 to each other prevents lags in motor movement, which may cause folds or ridges in material sheet 108.

In the exemplary implementation, first monitoring system 116 is configured to determine a position of material sheet 108 and to identify and locate features in material sheet 108. Monitoring system 116 includes a first camera 138, a second camera 140, and at least one illumination source 142, that work in combination to acquire data indicative of sheet 108. Alternatively, monitoring system 116 may only include a single camera. It is understood that the number and configuration of cameras 138 and 140 and illumination source 142 shown in FIG. 1 are not meant to be limiting. In this regard, monitoring system 116 may include any number of cameras and/or illumination sources arranged in particular geometric configurations depending on the type of material being inspected and/or the features desired to be detected. Cameras 138 and 140 and illumination source 142 are coupled in communication with each other and with control system 104 such that control system 104 may process the image data captured by monitoring system 116. As will be explained in further detail below, first monitoring system 116 utilizes both two-dimensional (2D) and three-dimensional (3D) information in conjunction with in-process inspection such that more efficient and reliable detection and characterization of features in sheet 108 are provided.

Cameras 138 and 140 may be any suitable camera or other image capturing device capable of capturing data indicative of material sheet 108 such that control system 104 can process the data and determine a position of sheet 108 and whether a feature is present in sheet 108. In particular, cameras 138 and 140 typically capture images of sheet 108 and relay the image data to control system 104 for analysis. Alternatively, monitoring system 116 may include a processor (not shown) that is configured to determine the position of material sheet 108 independent of control system 104 and relay the position data to control system 104 for distribution to other systems of component fabrication system 100. In one implementation, cameras 138 and 140 are video cameras, infrared-sensitive cameras, visible light cameras with infrared-pass filtration, fiber optic cameras, coaxial cameras, and monochrome cameras. Cameras 138 and 140 are positioned proximate sheet 108 on a stand or mounted to a frame or similar device.

The term "feature," as used herein, is not meant to be limiting, as a feature could be any aspect, discontinuity, imperfection, or inconsistency in sheet 108 that may require attention, such as adjustment of the position of sheet 108 and roll 126. For example, an inconsistency could be a material wrinkle or FOD, such as paper, plastic sheet, resin balls, carbon fiber remnants, or other material inimical to the production of component 102. Moreover, monitoring system 116 can detect the presence of features associated with sheet 108 that would not ordinarily be characterized as an inconsistency, such as a ply boundary, topology, or shape/contour, the positioning of which are requirements of the engineered sheet design specification. More specifically, material sheet 108 includes opposing edges 144 and 146 that define a width 147. Edges 144 and 146 are monitored by first monitoring system 116 to determine an initial position of sheet 108, as described in further detail below. Furthermore, material sheet 108 includes a thickness 148 that is monitored by monitoring system 116 to determine the presence of any bubbles, wrinkles, or folds in material sheet 108, as described in further detail below.

First monitoring system 116 is used to inspect any number of material sheets in a variety of industries where detection of features of the sheet is required or desired, such as in the aircraft, automotive, or construction industries. Thus, the term "sheet" is also not meant to be limiting, as monitoring system 116 could be used to inspect any number of parts or structures of different shapes and sizes, such as machined forgings, castings, or panels. In the exemplary implementation, material sheet 108 is a sheet of woven carbon fiber composite material. Alternatively, material sheet 108 is any type of material, such as, but not limited to, composite, plastic, and/or metallic materials. Furthermore, although monitoring system 116 is described herein as monitoring newly manufactured material sheets, monitoring system 116 is also configured to monitor or inspect existing material sheets that are being inspected for preventative maintenance purposes.

In some implementations, first monitoring system 116 could also be used in conjunction with an image-projecting device (not shown). The image-projecting device could be any device capable of projecting a visible image onto material sheet 108. For instance, the image-projecting device could be a laser projector or a digital projector capable of projecting an image indicative of a feature captured by cameras 138 and 140 such that the location of the feature can be readily identified by an operator. In addition, the image-projecting device could project images for facilitating the manufacture of component 102, such as pattern 130 for locating component 102 in sheet 108.

As described above, cameras 138 and 140 and illumination source 142 monitor material sheet 108 and communicate with control system 104. In the exemplary implementation, first monitoring system 116 communicates data representative of features and position of sheet 108, as collected by cameras 138 and 140 and illumination source 142, to control system 104 via communications cable(s) or optical fibers. Alternatively, monitoring system 116 transmits data to control system 104 via wireless communications. Cameras 138 and 140 and illumination source 142 may be either directly connected to control system 104, or indirectly connected, such as via a network. In further implementations of the present invention control system 104 may be located proximate to first monitoring system 116, such that remote connections between monitoring system 116 and control system 104 are not necessary.

In the exemplary implementation, illumination source 142 is a laser generator that projects a laser fan 150 onto material sheet 108 after sheet 108 has been unfurled from roll 126. Fan 150 intersects sheet 108 at a predetermined incidence angle and produces a laser line 152 that extends transversely across sheet 108. In one particular implementation, the incidence angle is approximately 15 degrees, however, in alternate implementations, incidence angles between approximately 10 degrees and approximately 35 degrees may be used. Alternately, any other suitable incidence angle may be used. As described herein, monitoring system 116 is configured to detect and characterize various features of interest (e.g. edges, gaps, wrinkles, puckers, overlaps, foreign object debris (FOD), etc.) along laser line 152. Preferably, monitoring system 116 is positioned such that laser line 152 is relatively close (e.g. as close as practical) to roll 126 so that features of interest and the position of sheet 108 may be detected relatively quickly in the manufacturing process.

A reflection of laser line 152 reflects up to cameras 138 and 140 approximately normally from material sheet 108, however, in alternate implementations, any other suitable reflection angle may be used. Cameras 138 and 140 capture the reflection of laser line 152 and transmit the image data to control system 104 for analysis and display. Although control system 104 may process the image data upon receipt, control system 104 may also store the image data for subsequent review and analysis. Control system 104 is capable of generating data and/or images indicative of a position or a feature of material sheet 108 and may also allow a user to store and edit previously generated data and/or images, such as in memory device 112. However, it is understood that control system 104 need not generate images, as control system 104 could mathematically collect and analyze data and generate, for example, location information of various sheet features in terms of coordinates or the like.

More specifically, in the exemplary implementation, cameras 138 and 140 are trained on material sheet 108 such that both cameras 138 and 140 capture the intersection of laser line 152 with both side edges 144 and 146 of sheet 108. Cameras 138 and 140 capture the intersections and relay the image data to control system 104, which calculates the position of sheet 108 on conveyor belt 124 based on the image data. Monitoring system 116 continues to capture image data and relay the data to control system 104 as motors 132 and 136 propel sheet 108 downstream. Control system 104 receives the subsequent image data and calculates the successive position of sheet 108 based on the most recently received image data. Control system 104 then compares the initial calculated position of sheet 108 with each subsequent monitored position of sheet 108 to determine if the successive positions of sheet 108 are aligned with the initially determined position. While monitoring the two-dimensional position of sheet 108, monitoring system 116, in combination with control system 104, also inspects sheet 108 for three-dimensional features, such as the presence of FOD, a bubble, and wrinkles or folds in sheet 108.

Upon detection of the presence of a feature, control system 104 notifies an operator on a display (not shown) and terminates operation of at least motors 132 and 136 so that the defect feature can be removed or material sheet 108 can be advanced past the defect. Alternatively, control system 104 may change the component layout or orientation of one or more components 102 on sheet 108 such that the detected feature is not incorporated into a component 102, as described below. However, upon detection that sheet 108 is out of alignment, that is, a subsequent position of sheet 108 does not match the initial determined position, control system 106 controls operation of alignment device 134 to adjust at least one of roll 126 and sheet 108 such that sheet 108 is aligned with the initial position. Because the position of roll 126 and sheet 108 is adjustable via alignment device 134, control system 104 is able to use substantially the full width 147 of material sheet 108 when determining the component layout.

As described above, component fabrication system 100 also includes a cutting system 120, having at least one cutting head 128, communicatively coupled to control system 104. In the exemplary implementation, cutting system 120 is a fluid jet cutting apparatus configured to propel a jet of fluid through material sheet 108 to cut component 102 from sheet 108. More specifically, fluid jet cutting system 120 utilizes a jet of water to cut component 102 from sheet 108. Alternatively or additionally, fluid jet cutting apparatus 120 may include a plurality of abradable particles in the fluid jet to cut component 102 from sheet 108.

In the exemplary implementation, control system 104 utilizes the determined position of material sheet 108 and computerized model 106 of at least one component 102 that has been loaded thereon to determine the most efficient layout of components 102 on sheet 108 and to cut components 102 from sheet 108. More specifically, computerized model 106 may include a plurality of models of different components 102 to be cut from sheet 108, and control system 108 includes logic to determine a layout including an optimum position and orientation of each component 102 such that a maximum amount of material sheet 108 is used. Once the layout is determined, control system 104 also generates an optimum tool path for cutting heads 128 that specifies how cutting heads 128 are to be controlled to cut components 102 from material sheet 108. More specifically, control system 104 generates a set of coordinates with respect to the position of sheet 108 for which each cutting head 128 is to follow. In some embodiments, each component 102 is cut by a single head 128. In another implementation, more than one cutting head 128 may combine to cut a single component 102 from material sheet 108. Cutting system 120 is configured to receive the optimal tool path for each cutting head 128 from control system 104 and execute the tool path to cut each component 102 from material sheet 108. Alternatively, cutting system 120 may include a processor (not shown) that is configured to receive the position data of material sheet 108 and computerized model 106 from control system 104 and to determine the component layout and optimal tool path of cutting heads 128 independent of control system 104.

During cutting, the fluid jet from each cutting head 128 extends completely through thickness 148 of material sheet 108 to completely separate component 102 from sheet 108 and provide a clean edge therebetween. As such, cutting system 120 is configured to cut a final desired size of each component 102 in a single cut rather than cutting an oversize pattern that not requires trimming to fabricate the final desired component size. Cutting each component 102 in close proximity to adjacent components 102 and to a final desired size enables component fabrication system 100 maximize the usage of material sheet 108 and generate less waste than known cutting systems. Furthermore, cutting system 120 is also synched with conveyor system 114 such that cutting system 120 is able to cut components 102 while material sheet 108 is moving down conveyor belt 124.

In the exemplary implementation, second monitoring system 118 is communicatively coupled to control system 104 and is configured to compare component pattern 130 downstream of cutting system 120 to computerized model 106 to identify any defective component patterns of patterns 130 on sheet 108. Second monitoring 118 is substantially similar to first monitoring system 116 in that second monitoring system 118 also includes a first camera 154, a second camera 156, and an illumination source 158 that work in combination to acquire data indicative of sheet 108 and components 102. It is understood that the number and configuration of cameras 154 and 156 and illumination source 158 shown in FIG. 1 are not meant to be limiting. In this regard, monitoring system 118 may include any number of cameras and/or illumination sources arranged in particular geometric configurations depending on the type of material being inspected and/or the features desired to be detected. Cameras 154 and 156 and illumination source 158 are coupled in communication with each other and with control system 104 such that control system 104 processes data captured by monitoring system 118.

Cameras 154 and 156 may be any suitable camera or other image capturing device capable of capturing data indicative of material sheet 108 such that control system 104 can process the data and compare a video image received from monitoring system 118 to computer model 106 to confirm the accuracy and completeness of component pattern 130 and to identify any defects in component pattern 130. Cameras 154 and 156 and illumination source 158 may be either directly connected to control system 104, or indirectly connected, such as via a network. In further implementations of the present invention control system 104 may be located proximate to first monitoring system 116, such that remote connections between monitoring system 118 and control system 104 are not necessary.

In the exemplary implementation, illumination source 158 is a laser generator that projects a laser fan 160 onto material sheet 108 after component patterns 130 have been cut into sheet 108 by cutting system 120. Fan 150 intersects sheet at a predetermined incidence angle and produces a laser line 162 that extends transversely across sheet 108. As described herein, monitoring system 118 is configured to capture images of sheet 108 to enable control system 104 to compare component patterns 130 with computer model 106. A reflection of laser line 162 reflects up to cameras 154 and 156 approximately normally from material sheet 108, however, in alternate implementations, any other suitable reflection angle may be used. Cameras 154 and 156 capture the reflection of laser line 162 and transmit the image data to control system 104 for analysis and display.

More specifically, in the exemplary implementation, cameras 154 and 156 are trained on material sheet 108 such that both cameras 154 and 156 capture the intersection of laser line 152 with component patterns 130. Cameras 154 and 156 capture the intersections and relay the image data to control system 104, which compares the received image data, corresponding to component patterns 130, to the determined component layout and computerized models 106. Control system 104 is then able to identify a defective component pattern of patterns 130 based on the comparison. Alternatively, second monitoring system 118 includes a processor (not shown) configured to receive computerized models 106 of components 102 from control system 104 and to compare models 106 to the image date to confirm the accuracy of component pattern 130 and to identify any defective patterns of patterns 130 independent of control system 104. As used herein, the term "defective" is meant to include any component pattern 130 that does not match computerized model 106, or any component pattern 130 that has not been completed, that is, where the cutting jet did not extend completely through thickness 148 of material sheet 108 or an end point of pattern 130 did not meet a beginning point due to movement of sheet 108.

Upon identification of a defective component pattern of patterns 130, control system 104 notifies an operator on a display (not shown) and terminates operation of at least systems 114 and 120. Control system 104 is then configured to determine whether the defective pattern can be repaired. If so, control system 104 utilizes second monitoring system 118 to precisely locate the defective component pattern and direct a cutting head 128 of cutting system 120 to the determined location to complete component pattern 130. Upon completion of the defective component pattern, control system 104 directs cutting head 128 to its previous position prior to the detection of a defective pattern 130. Control system 104 is then configured to restart at least system 114 and 120 such that each cutting head 128 finishes the pattern 130 that was being cut prior to detection of the defective pattern 130. As such, when systems 114 and 120 are restarted, patterns 130 that were stopped mid-cut can be completed without having to advance material sheet 108 and scrap the incomplete patterns 130.

As described above, component fabrication system 100 includes a removal system 122 communicatively coupled to control system 104. In the exemplary implementation, removal system 122 includes at least one suction device 164 configured lift component 102 from material sheet 108 downstream of cutting system 120. Alternatively, removal system 122 may be any type of removal system that enables operation of component fabrication system 100 as described herein. In the exemplary implementation, removal system 122 is synched with control system 104 such that control system 104 directs suction device 122 to a component 102 based on the determined component layout. Once suction device is position above component 102, removal system 122 lowers suction device 164 and such that component 102 is drawn to suction device 164 and is lifted directly upwards from material sheet 108. Suction device 164 lifts component 102 directly upwards, that is, in a direction perpendicular to material sheet 108, to ensure that suction device 164 does not move material sheet 108 in a side-to-side direction that may affect upstream operations. Furthermore, control system 104 is configured to adjust the suction power of each suction device 164 based on a size of component 102 to be removed such that each suction device 164 uses only as much energy as is necessary. Removal system 122 is then configured to deposit each component 102 into a corresponding bin or rack (not shown) with like components 102.

Figure 2A:
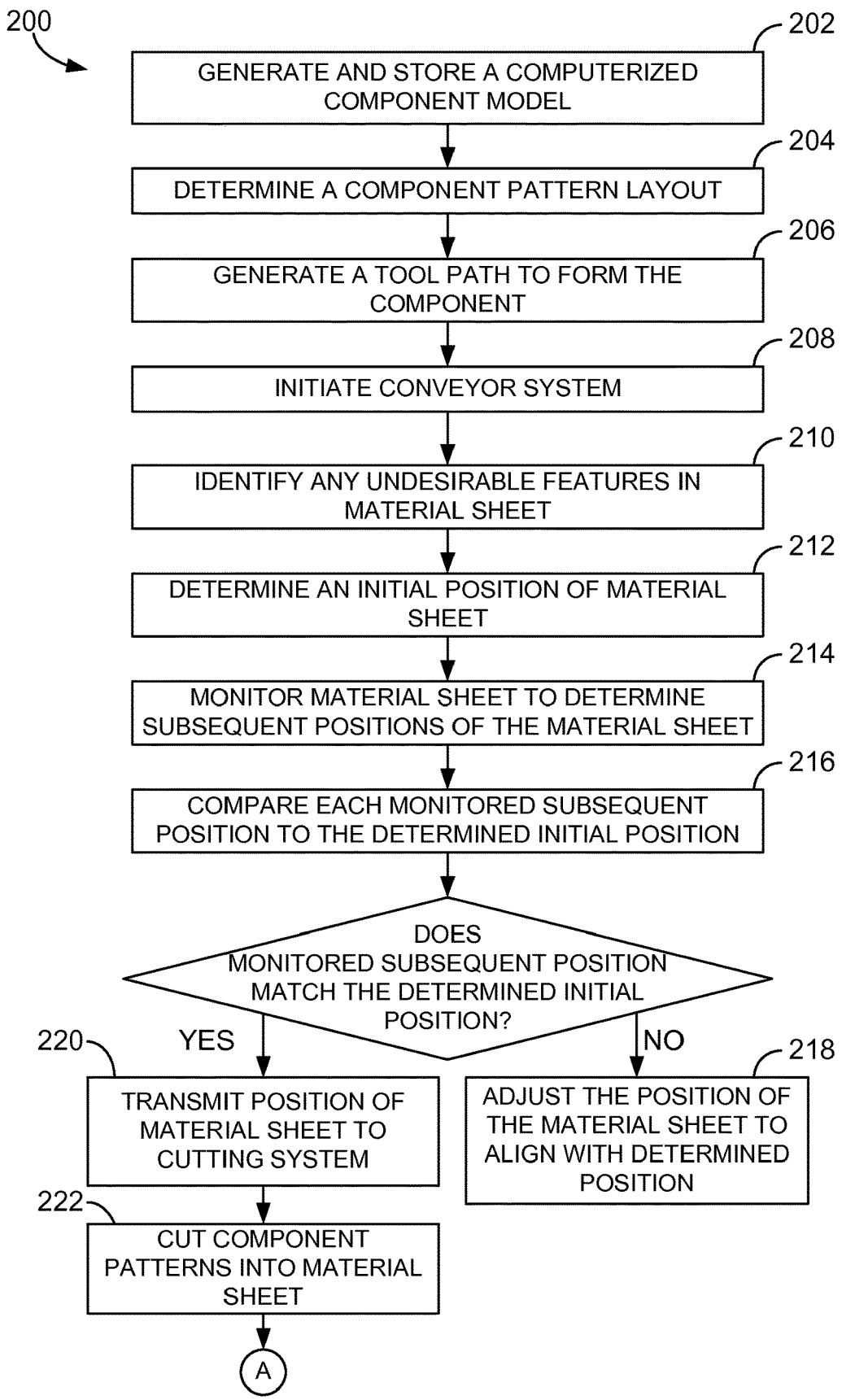
FIG. 2A is a flow chart illustrating a first portion of a method for forming a component using the automatic component fabrication system shown in FIG. 1.
Figure 2B:
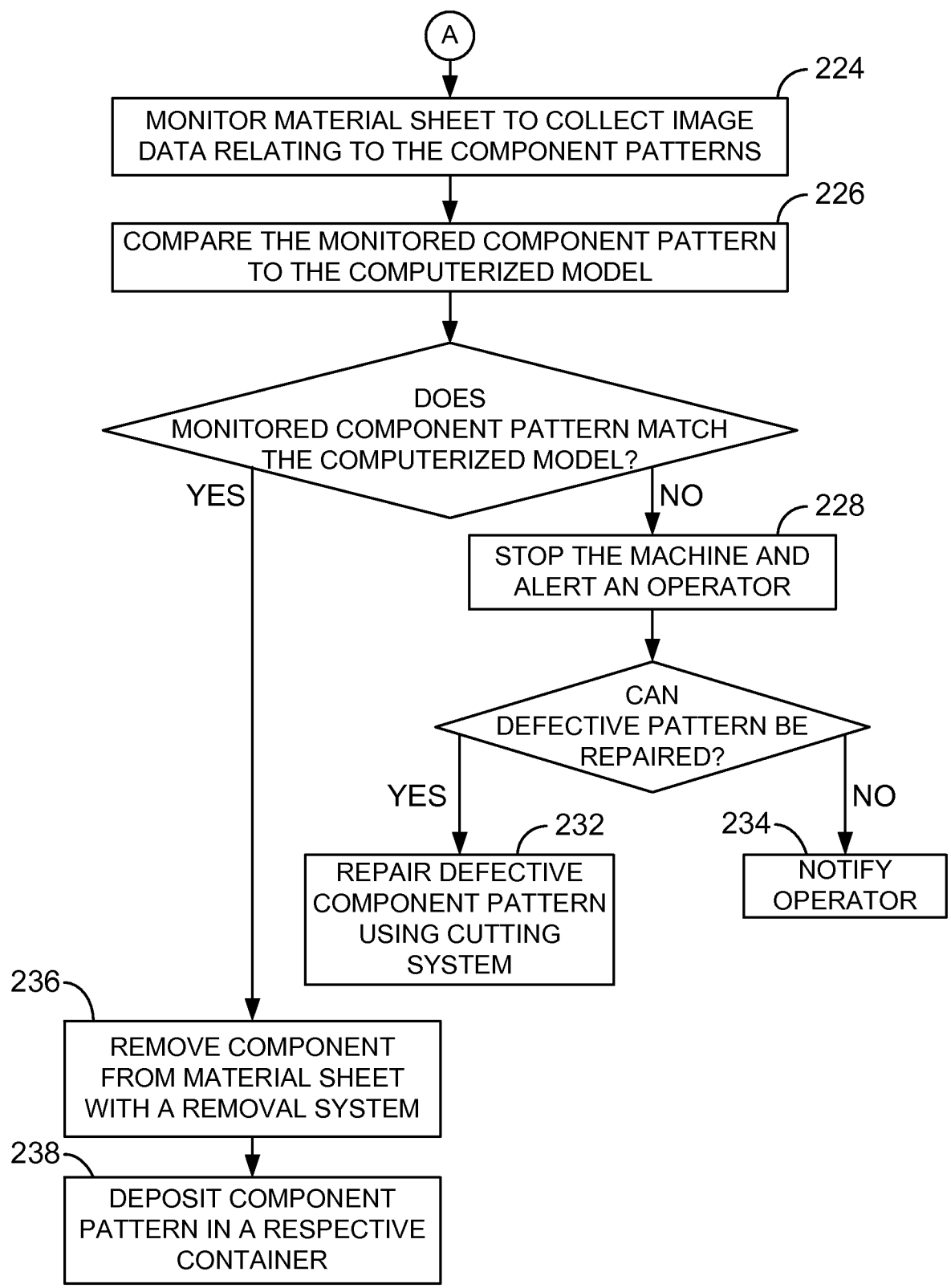
FIG. 2B is a flow chart illustrating a second portion of a method for forming a component using the automatic component fabrication system shown in FIG. 1.

FIG. 2A is a flow chart illustrating a first portion of a method 200 for forming a component, such as component 102 (shown in FIG. 1), using an automatic component fabrication system, such as automatic component fabrication system 100 (shown in FIG. 1). FIG. 2B is a flow chart illustrating a second portion of method 200 for forming the component using the automatic component fabrication system. Method 200 includes generating and storing 202 computerized models, such as computerized models 106 (shown in FIG. 1) of at least one component, on a control system, such as control system 104 (shown in FIG. 1). In one implementation, the computerized model may be generated independent of the control system and simply transmitted to the control system for storage. The control system utilizes the various computerized models to determine 204 a component pattern layout that includes an optimum position and orientation of each component to be formed such that a maximum amount of the material sheet is used during fabrication. Once the component layout is determined, a tool path is generated 206 to form the component from the material sheet based on the computerized model. In one implementation, the tool path is generated by the control system and transmitted to a cutting system, such as cutting system 120 (shown in FIG. 1). In another implementation, the cutting system receives the determined component layout and generates the tool path independent of the control system.

Method 200 then includes initiating 208 operation of a conveyor system, such as conveyor system 114 (shown in FIG. 1) to cause a material roll, such as material roll 126 (shown in FIG. 1) to unfurl onto a conveyor belt, such as conveyor belt 124 (shown in FIG. 1). As the material sheet travels on the conveyor belt, a first monitoring system, such as first monitoring system 116 (shown in FIG. 1), monitors the material sheet to identify 210 any undesirable features in the sheet and to determine 212 an initial position of the sheet. The first monitoring system continuously monitors the material sheet to determine 214 the subsequent positions of the material sheet based on image data collected by the first monitoring system. In one embodiment, the first monitoring system captures image data of the material sheet and relays the data to the control system to calculate the successive position of the material sheet based on the most recently received image data. In another embodiment, the first monitoring system determines the subsequent positions of the sheet and transmits the position data to the control system.

The control system then compares 216 the determined initial position of the material sheet to each subsequent monitored position of the sheet to determine if the successive positions of the sheet are aligned with the initially determined position. If one of the monitored subsequent positions does not match the determined initial position, then an alignment device, such as alignment device 134 (shown in FIG. 1), adjusts 218 the position of the material sheet to align the material sheet with the initial determined position. Once the material sheet is aligned, then the position of the material sheet is transmitted 220 to the cutting system. However, if the monitored subsequent positions do match the determined initial position, then no adjustment is required and the position of the material sheet is transmitted 220 to the cutting system. Method 200 further includes cutting 222 component patterns into the material sheet using the cutting system. As described above, the cutting system includes a high-pressure fluid jet cutting apparatus that cuts the component pattern from the material sheet based on the determined initial position of the material sheet, the generated tool path, and the computerized component models.

Once the component patterns are cut into the material sheet, a second monitoring system, such as second monitoring system 118 (shown in FIG. 1), monitors 224 the material sheet to collect image data relating to the component patterns. Each monitored component pattern is then compared 226 to a corresponding computerized model to determine the accuracy and completeness of the fabricated component pattern and to identify any defective component patterns based on the computerized model. In one embodiment, the second monitoring system transmits the collected image data of the component patterns to the control system to enable the control system to perform the comparison. In another embodiment, the control system transmits the computerized models to the second monitoring system to enable the second monitoring system to compare the computerized models to the collected image data.

Upon identification of a defective component pattern that does not match the computerized model, one of the control system or the second monitoring system terminates 228 operation of the conveyor and cutting systems and notifies an operator of the defective component. The control system is then configured to determine 230 whether the defective component pattern can be repaired. If so, the control system utilizes the second monitoring system to precisely locate the defective component pattern and direct the cutting system to the determined location to repair 232 the defective component pattern. If the defective component pattern cannot be repaired, then the control system is configured to notify 234 the operator as such.

When the defective component pattern is repaired, or if the monitored component pattern matches the computerized model, the component pattern is removed 236 from the material sheet using a removal system, such as removal system 122 (shown in FIG. 1). As described above, the removal system utilizes at least one suction device, such as suction device 164 (shown in FIG. 1), to lift each component from the material sheet. The removal system is then configured to deposit 238 the component in a corresponding container housing like components.

The implementations included herein describe an automatic component fabrication system that follows a generated tool path to cut a component from a sheet of material. The automatic component fabrication system described herein includes a first monitoring system that, when used in combination with a control system, determines if the sheet of material is out of alignment. In such cases, an alignment device automatically adjusts the position of the material sheet to the proper position. As such, the fabrication system is able to make use of substantially an entire width of the material. Furthermore, the component fabrication system includes a high-pressure fluid jet cutting apparatus that is able to accurately cut components that are in close proximity to each other on the material and to a final desired size such that a maximum amount of the material is used and less waste is generated than in known fabrication systems. Moreover, the component fabrication system includes a second monitoring system that, in combination with the control system, compares the fabricated components to computerized models to determine the accuracy and completeness of the component and to identify any defective components. Upon detection of a defective component, the fabrication system controls the cutting system to repair the component, if possible, and then complete the component from which it was called to make the repair. As such, components that are stopped mid-cut can be completed without having to advance the material and scrap the incomplete components. Accordingly, the component fabrication system described herein facilitates a more automated fabrication method that enables a less expensive manufacturing and assembly process.

Although specific features of various implementations of the invention may be shown in some drawings and not in others, this is for convenience only. In accordance with the principles of the invention, any feature of a drawing may be referenced and/or claimed in combination with any feature of any other drawing.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automatic component fabrication system for use in fabricating a component, said automatic component fabrication system comprising:
    a control system comprising a memory including a computerized model of the component to be fabricated;
    a conveyor system communicatively coupled to said control system, said conveyor system configured to support a sheet of material unfurled from a roll of sheet material;
    a first monitoring system communicatively coupled to said control system, said first monitoring system comprising a first illumination device and at least one camera, said first monitoring system configured to:
        determine an initial position of the sheet of material relative to said conveyor system at a first location along said conveyor system as the sheet of material is unfurled from the roll;
        determine a subsequent position of the sheet of material relative to said conveyor system at a plurality of sequential locations along said conveyor system; and
        compare the determined initial position of the sheet of material to each determined subsequent position of the sheet of material at each location of the plurality of sequential locations;
    an alignment device comprising a pair of arms that partially surround the sheet of material, said alignment device configured to adjust the position of the sheet of material to maintain the determined initial position when the determined subsequent position of the sheet of material at any location of the plurality of sequential locations is different from the determined initial position;
    a cutting system communicatively coupled to said control system, said cutting system configured to cut the component from the sheet of material, said cutting system communicatively coupled to said first monitoring system such that the component is cut based on the position of the sheet of material on said conveyor system and the computerized model; and
    a second monitoring system communicatively coupled to said control system, said second monitoring system comprising a second illumination device and at least one camera, said second monitoring system configured to compare the fabricated component to the computerized model.

2. The automatic component fabrication system in accordance with claim 1 further comprising a component removal system communicatively coupled to said control system, wherein said component removal system comprises at least one removal device configured to lift the fabricated component from the sheet of material.

3. The automatic component fabrication system in accordance with claim 1, wherein said conveyor system comprises:
    a conveyor configured to support the sheet of material;
    a first motor configured to control said conveyor; and
    a second motor configured to directly control said sheet of material, wherein said first motor is synched to said second motor such that said first and said second motors are simultaneously active or simultaneously idle.

4. The automatic component fabrication system in accordance with claim 1, wherein said cutting system comprises a fluid jet cutting apparatus.

5. The automatic component fabrication system in accordance with claim 1, wherein said first and said second illumination devices are configured to project a laser line onto the sheet of material, and wherein said at least one camera is configured to capture a reflection of the laser line.

6. The automatic component fabrication system in accordance with claim 1, wherein said second monitoring system is configured to identify a defective fabricated component based on the comparison.

7. A method for forming a component, said method comprising:
    positioning a sheet of material onto a conveyor system, the sheet of material unfurled onto the conveyor system from a roll of sheet material;
    determining an initial position of the sheet of material relative to the conveyor system at a first location along the conveyor system as the sheet of material is unfurled from the roll using a first monitoring system, wherein the first monitoring system includes a first illumination device and at least one camera;
    determining a subsequent position of the sheet of material relative to the conveyor system at a plurality of sequential locations along the conveyor system using the first monitoring system;
    comparing the determined initial position of the sheet of material to each determined subsequent position of the sheet of material at each location of the plurality of sequential locations;
    adjusting the position of the sheet of material using an alignment device when the determined subsequent position of the sheet of material at any location of the plurality of sequential locations is different than the determined initial position, wherein the alignment device includes a pair of arms that partially surround the sheet of material;

cutting the component from the sheet of material with a cutting system, wherein the cutting system is communicatively coupled to the first monitoring system such that the component is cut based on the position of the sheet of material on the conveyor system and based on a predetermined computerized model; and comparing the component to the predetermined computerized model using a second monitoring system that includes a second illumination device and at least one camera.

8. The method in accordance with claim 7 further comprising removing the component from the sheet of material using a component removal system.

9. The method in accordance with claim 8 further comprising depositing the component in a corresponding container using the component removal system.

10. The method in accordance with claim 7 further comprising generating a tool path to control a cutting system, wherein the tool path is based on the predetermined computerized model.

11. The method in accordance with claim 7 further comprising maintaining the determined initial position of the sheet of material.

12. The method in accordance with claim 7, wherein determining an initial position of the sheet of material comprises projecting a laser line onto the sheet of material using the first illumination device and capturing a reflection of the laser line with the at least one camera.

13. The method in accordance with claim 7, wherein determining an initial position of the sheet of material comprises determining the position of opposing edges of the sheet of material.

14. The method in accordance with claim 7, wherein determining an initial position of the sheet of material comprises detecting a presence of a fold in the sheet of material.

15. The method in accordance with claim 7, wherein cutting the component from the sheet of material comprises cutting the component from the sheet of material using a fluid jet cutting apparatus.

16. The method in accordance with claim 7, wherein comparing the component to the predetermined computerized model further comprises identifying a defective component based on said comparison.

17. The method in accordance with claim 16 further comprising repairing the defective component.

18. The method in accordance with claim 7 further comprising monitoring the component using the second monitoring system.

* * * * *